US012765466B2

(12) United States Patent
Choudhary et al.

(10) Patent No.: US 12,765,466 B2
(45) Date of Patent: Oct. 20, 2026

(54) FIXED BLADE CONCENTRIC KNIFE HOLDER FOR AGRICULTURAL HARVESTERS

(71) Applicant: CNH Industrial America LLC, New Holland, PA (US)

(72) Inventors: Shubham Choudhary, Ghaziabad (IN); Cooper Linde, Lancaster, PA (US); Nathan E. Isaac, Lancaster, PA (US)

(73) Assignees: CNH Industrial America LLC, New Holland, PA (US); CNH Industrial Technology (India) Private Limited (IN)

( * ) Notice: Subject to any disclaimer, the term of this patent is extended or adjusted under 35 U.S.C. 154(b) by 316 days.

(21) Appl. No.: 18/634,317

(22) Filed: Apr. 12, 2024

(65) Prior Publication Data

US 2024/0341228 A1 Oct. 17, 2024

Related U.S. Application Data

(60) Provisional application No. 63/459,042, filed on Apr. 13, 2023.

(51) Int. Cl.
*A01F 12/40* (2006.01)
*A01D 41/12* (2006.01)

(52) U.S. Cl.
CPC .......... *A01F 12/40* (2013.01); *A01D 41/1243* (2013.01)

(58) Field of Classification Search
CPC .... A01D 41/1243; A01F 12/40; A01F 29/095
See application file for complete search history.

(56) References Cited

U.S. PATENT DOCUMENTS 2,842,175 A * 7/1958 Thompson .............. A01F 12/40 239/650
2,865,416 A * 12/1958 Hetteen ................... A01F 12/40 241/243

(Continued)

FOREIGN PATENT DOCUMENTS

EP 0168516 A1 * 1/1986 ............. A01F 12/40
EP 832357 C * 1/1986 ............. A01F 12/40

(Continued)

OTHER PUBLICATIONS

The Extended European Search Report issued Aug. 22, 2024, by the European Patent Office in corresponding European Patent Application No. 24167761.6-1105. (9 pages).

*Primary Examiner* — Arpad Fabian-Kovacs
(74) *Attorney, Agent, or Firm* — Buchanan Ingersoll & Rooney PC

(57) ABSTRACT

An agricultural harvester residue counterknife assembly having: a first blade extending in a first blade plane; and a knife holder. The knife holder includes a first blade mount configured to secure to the first blade, a first arm extending from the blade mount and having a first passage extending therethrough, and a second arm extending from the blade mount and having a second passage extending therethrough. The first arm and the second arm define an opening between the first arm and second arm, the opening extends along a blade shaft direction that is generally orthogonal to the first blade plane, and the first passage and the second passage are collinear along an axis that passes through the opening.

20 Claims, 7 Drawing Sheets

(56) References Cited

U.S. PATENT DOCUMENTS

| | | | | | |
|---|---|---|---|---|---|
| 2,954,812 | A * | 10/1960 | Anton | A01F 12/40 | 241/243 |
| 4,077,573 | A * | 3/1978 | Kersey | A01F 12/18 | 241/243 |
| 4,637,406 | A * | 1/1987 | Guinn | A01F 12/40 | 416/178 |
| 5,542,883 | A * | 8/1996 | Cruson | A01D 41/1243 | 460/112 |
| 5,928,080 | A * | 7/1999 | Jakobi | A01F 12/40 | 56/505 |
| 7,484,350 | B2 | 2/2009 | Benes et al. | | |
| 7,510,472 | B1 * | 3/2009 | Farley | A01D 90/04 | 460/112 |
| 8,141,805 | B1 * | 3/2012 | Isaac | A01F 12/40 | 241/242 |
| 8,221,203 | B1 * | 7/2012 | Flickinger | A01F 29/095 | 460/112 |
| 8,920,227 | B2 | 12/2014 | Murray | | |
| 9,137,949 | B2 | 9/2015 | Isaac | | |
| 10,225,992 | B2 | 3/2019 | Dilts et al. | | |
| 2011/0070932 | A1 * | 3/2011 | Schlesser | A01F 12/40 | 460/59 |
| 2012/0056024 | A1 | 3/2012 | Isaac et al. | | |
| 2023/0148476 | A1 * | 5/2023 | Dilts | A01D 41/1243 | 460/112 |
| 2024/0341238 | A1 * | 10/2024 | Choudhary | A01F 12/40 | |

FOREIGN PATENT DOCUMENTS

| | | | |
|---|---|---|---|
| EP | 1849348 | B1 | 11/2008 |
| EP | 2055175 | A1 | 5/2009 |

* cited by examiner

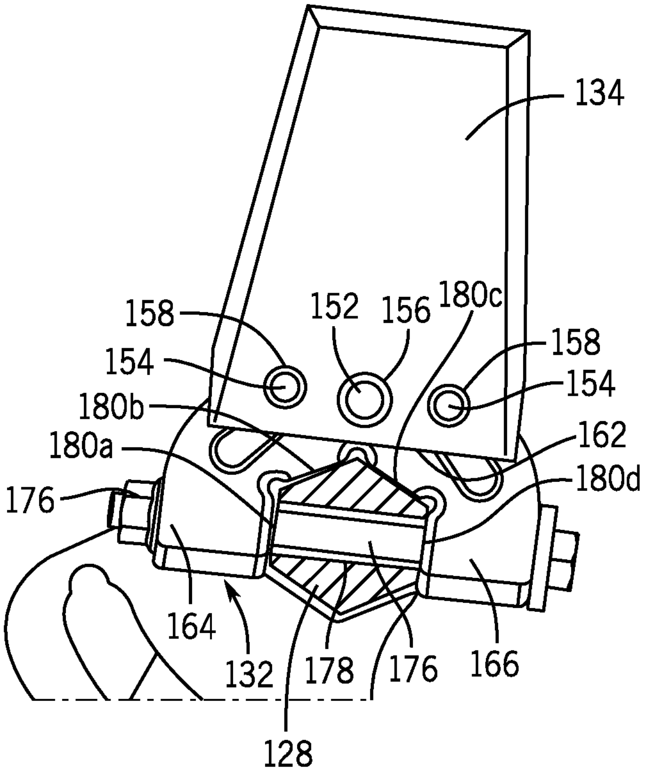
FIG. 7
FIG. 8
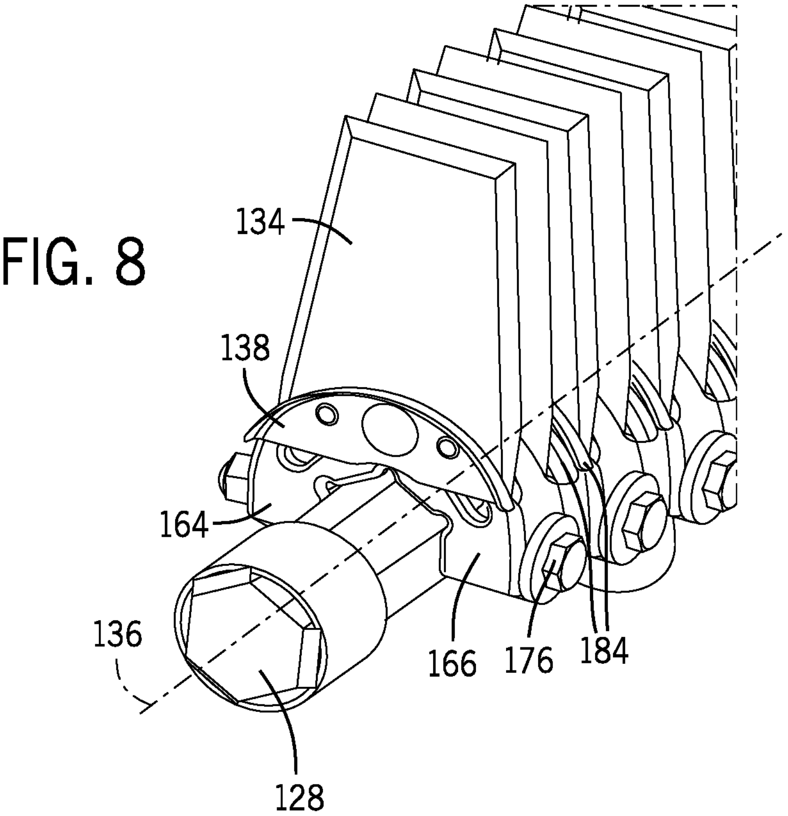

FIXED BLADE CONCENTRIC KNIFE HOLDER FOR AGRICULTURAL HARVESTERS

BACKGROUND OF THE INVENTION

Agricultural machines, such as combine harvesters, typically process crop material, and deposit a portion of the material on the ground behind the machine. As the purpose of the harvester is to collect grain, the material that is deposited is primarily material other than grain ("MoG"), such as chaff and stalks. This is commonly called "residue." It is generally desirable to minimize the size of the residue pieces, and to spread the residue evenly across the path of the machine. For this purpose, the machine may include a chopper to reduce the residue size, and a spreader to distribute the residue.

The chopper typically comprises a series of knives that rotate on a shaft and are partially enclosed by a shroud. The residue enters the shroud, and the knives strike and cut the residue. A typical chopper also has counterknives that extend radially towards the shaft, and between adjacent pairs of the rotating knives. The counterknives face towards the incoming stream of residue, and provide additional cutting edges. The counterknives can be mounted on their own shaft or on a support that can be moved to extend and retract the counterknives.

The counterknives experience wear during operation of the chopper, and therefore are made to be replaceable. It also is common to make the counterknives reversible, so that the operator can flip the counterknife to face a new edge towards the cutting direction. Examples of replaceable and/or reversible counterknives are shown, for example, in U.S. Pat. Nos. 10,225,992; 7,484,350; 8,920,227; and 9,137,949, and also in European Patent No. EP 1 849 348 B1. All of the foregoing references are incorporated herein by reference.

While known replaceable counterknife arrangements have utility, it has been found that the service and replacement of such counterknives can be time consuming and difficult. The inventors have found that further improvements to counterknives can benefit the art.

This description of the background is provided to assist with an understanding of the following explanations of exemplary embodiments, and is not an admission that any or all of this background information is necessarily prior art.

SUMMARY OF THE INVENTION

In a first exemplary aspect, there is provided a residue counterknife assembly for use on an agricultural harvester. The residue counterknife assembly comprises: a first blade extending in a first blade plane; and a knife holder. The knife holder comprises: a first blade mount configured to secure to the first blade, a first arm extending from the blade mount and having a first passage extending therethrough, and a second arm extending from the blade mount and having a second passage extending therethrough. The first arm and the second arm define an opening between the first arm and second arm, the opening extends along a blade shaft direction that is generally orthogonal to the first blade plane, and the first passage and the second passage are collinear along an axis that passes through the opening.

In another exemplary aspect, there is provided an agricultural harvester comprising: a chassis configured for movement on a surface; a threshing and separating system attached to the chassis; and a residue chopper configured to receive crop residue from the threshing and separating system. The residue chopper comprises: a housing defining a cutting chamber; a shaft rotatably mounted within the cutting chamber; a plurality of cutting knives extending radially from the shaft; a counterknife blade shaft mounted relative to the housing outside the cutting chamber and extending along a blade shaft direction; and a plurality of residue counterknife assemblies releasably secured to the counterknife blade shaft. Each residue counterknife assembly comprises: a first blade extending in a first blade plane that is generally orthogonal to the blade shaft direction, a second blade extending in a second blade plane that is generally orthogonal to the blade shaft direction, and a knife holder. The knife holder comprises: a first blade mount configured to secure to the first blade, a second blade configured to secure to the second blade a first arm extending from the blade mount and having a first passage extending therethrough, and a second arm extending from the blade mount and having a second passage extending therethrough. The first arm and the second arm define an opening between the first arm and second arm, the opening extends along to the blade shaft direction, and the first passage and the second passage are collinear and intersect to the blade shaft direction.

In another exemplary aspect, there is provided a method for servicing a counterknife system in an agricultural harvester. The counterknife system comprises: a blade shaft extending along a blade shaft direction, and at least one counterknife assembly comprising at least one blade, a knife holder having a blade mount configured to secure to the at least one blade, a first arm extending from the blade mount, and a second arm extending from the blade mount, wherein the first arm and the second arm define an opening between the first arm and second arm and wherein the opening is configured to surround at least two sides of the blade shaft. The method comprises: releasing a single fastener securing a counterknife assembly to the blade shaft; rotating the counterknife assembly to reverse the relative positions of the first blade and the second blade along the blade shaft direction; and securing the single fastener to secure the counterknife assembly to the blade shaft in the rotate position.

BRIEF DESCRIPTION OF THE DRAWINGS

Embodiments of inventions will now be described, strictly by way of example, with reference to the accompanying drawings, in which:

FIG. 7 is a cross-section view of the residue counterknife assembly of FIG. 5 secured to a counterknife blade shaft.

FIG. 8 is an isometric view of plural residue counterknife assemblies of FIG. 5 secured along the longitudinal axis of a counterknife blade shaft.

In the figures, like reference numerals refer to the same or similar elements.

DETAILED DESCRIPTION OF THE DRAWINGS

Exemplary embodiments of the present invention provide choppers and counterknives that may be used in agricultural equipment (e.g., combines, windrowers, etc.), or in other environments. However, the invention is not limited to any particular application except as may be specifically recited in the claims.

Figure 1:
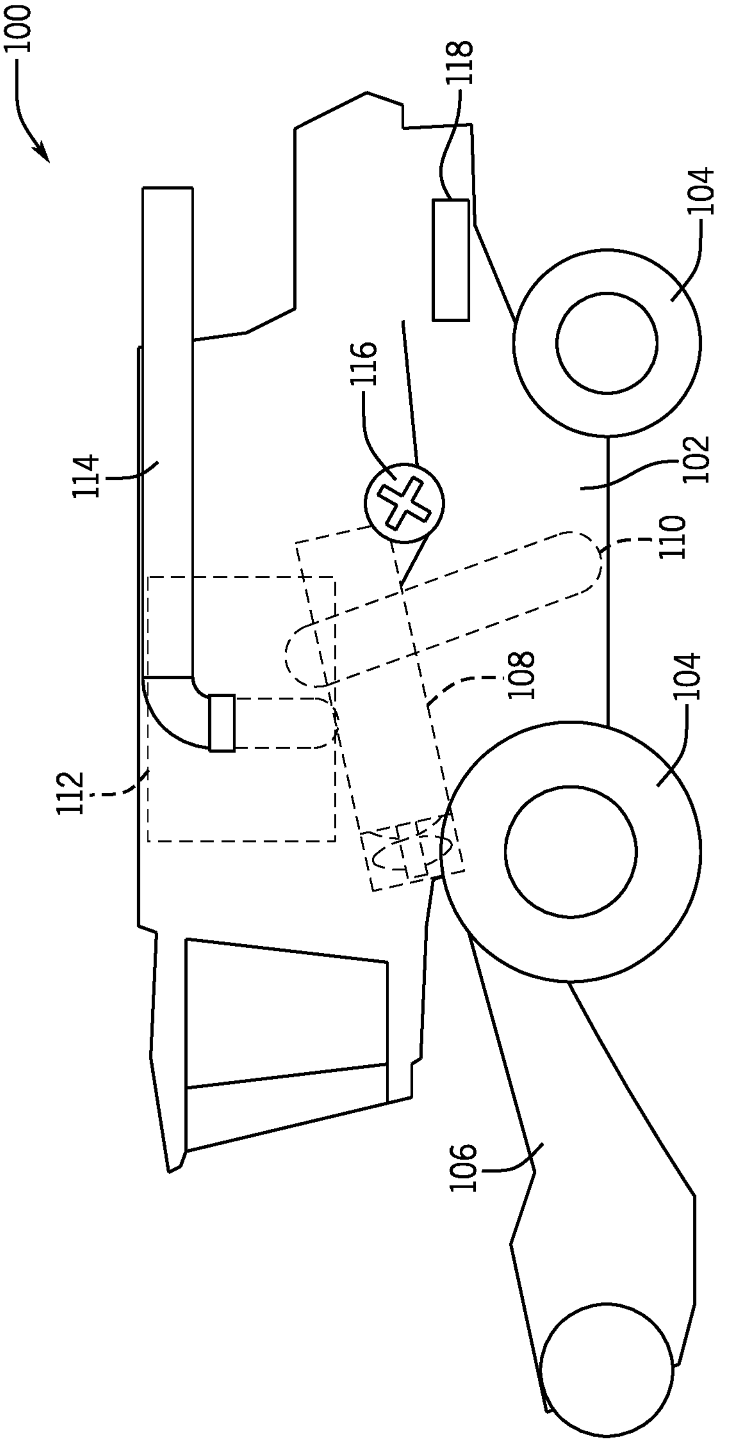
FIG. 1 schematically illustrates a side view of an example of an agricultural combine having residue chopper features such as described herein.

Referring to FIG. 1, an example of an agricultural combine 100 is schematically illustrated. The combine 100 includes a chassis 102 that is supported for movement on the ground by wheels 104 (e.g., pneumatic tires or tracked wheels). A header assembly 106 is attached to the combine 100 and configured to receive crop material and convey such material to a threshing and separating system 108 located in or on the chassis 102. The threshing and separating system 108 separates grain from the remaining crop material (also known as "straw," "material other than grain," "MoG," "crop residue," or simply "residue") and an auger 110 or the like conveys the grain to a grain hopper 112. The threshing and separating system may comprise an axial flow thresher, twin axial flow thresher, crossflow thresher, and so on. An unloader boom 114 may be provided to remove the separated grain as the combine 100 operates.

The residue exits the threshing and separating system 108 and falls into, or is otherwise conveyed to, a crop residue chopper 116, such as those described herein. The residue chopper 116 comminutes the residue, and the residue is then delivered to a spreader 118 that distributes the residue behind the combine 100.

The features described in relation to FIG. 1 are generally conventional, except for the residue chopper 116, and no further explanations of their structures or operations are necessary.

Figure 2:
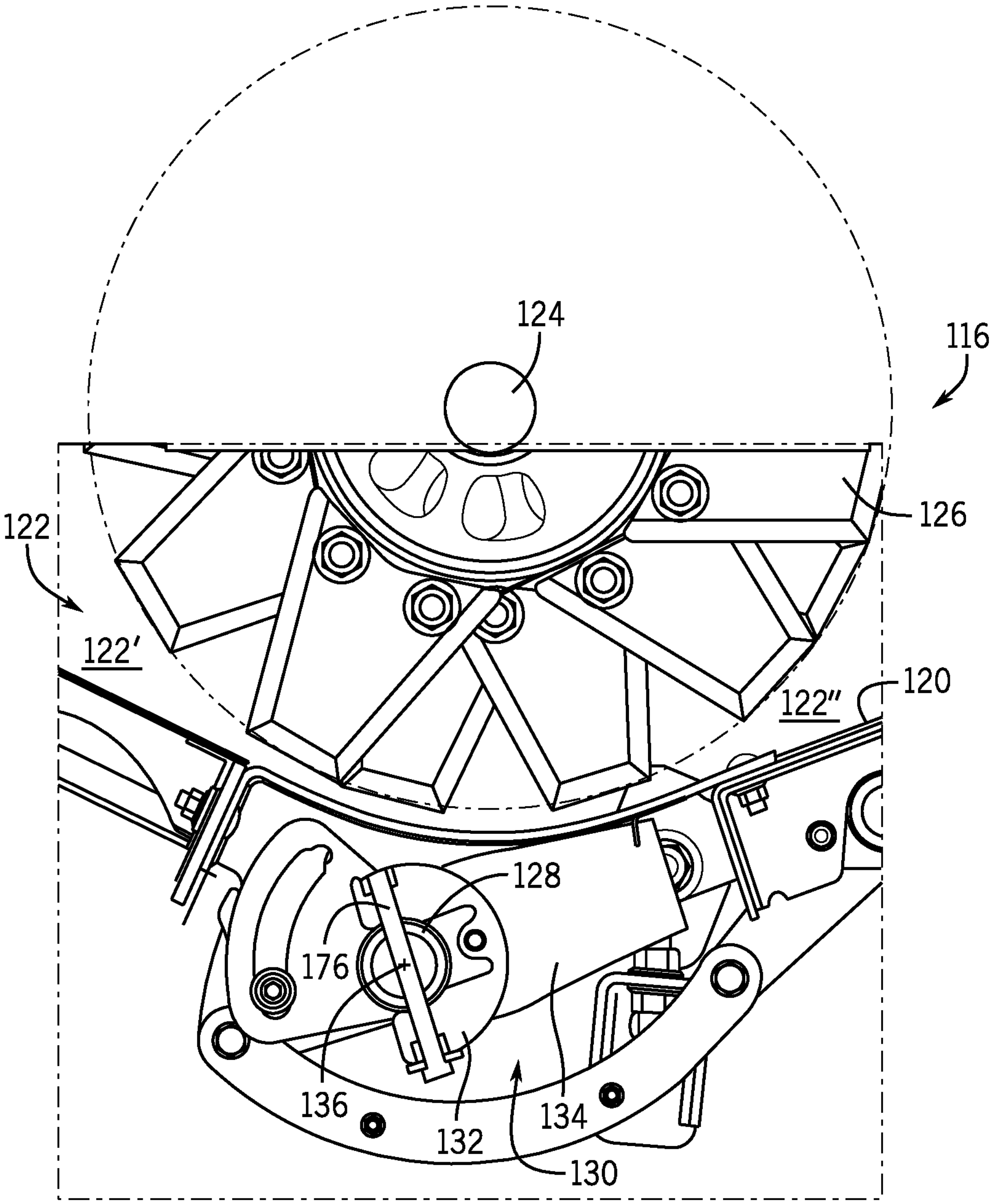
FIG. 2 is a cross-section view of a crop residue chopper having an exemplary embodiment of a residue counterknife assembly.
Figure 3:
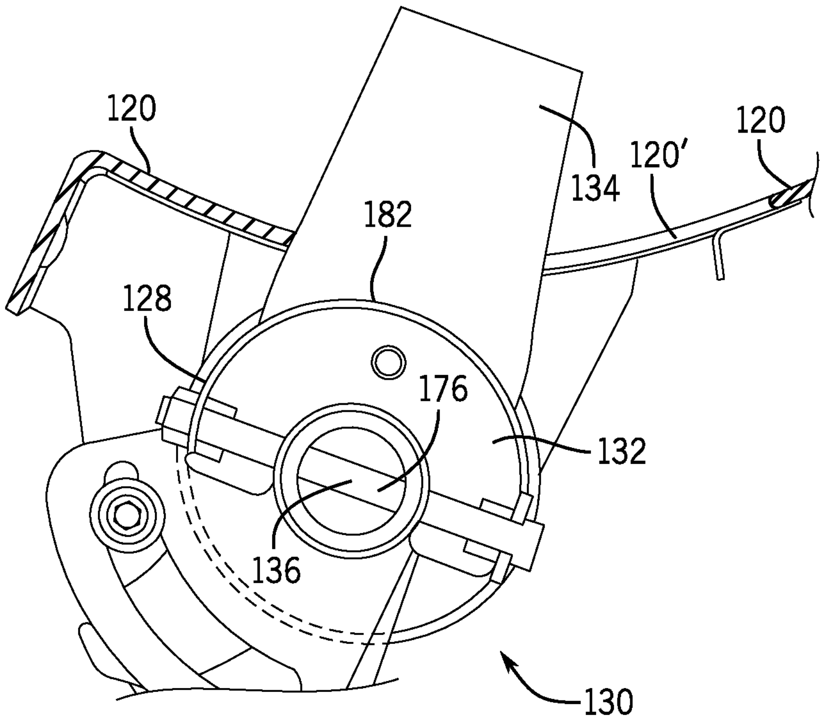
FIG. 3 is a cross-section view of the residue counterknife assembly of FIG. 2 in an extended position.
Figure 4:
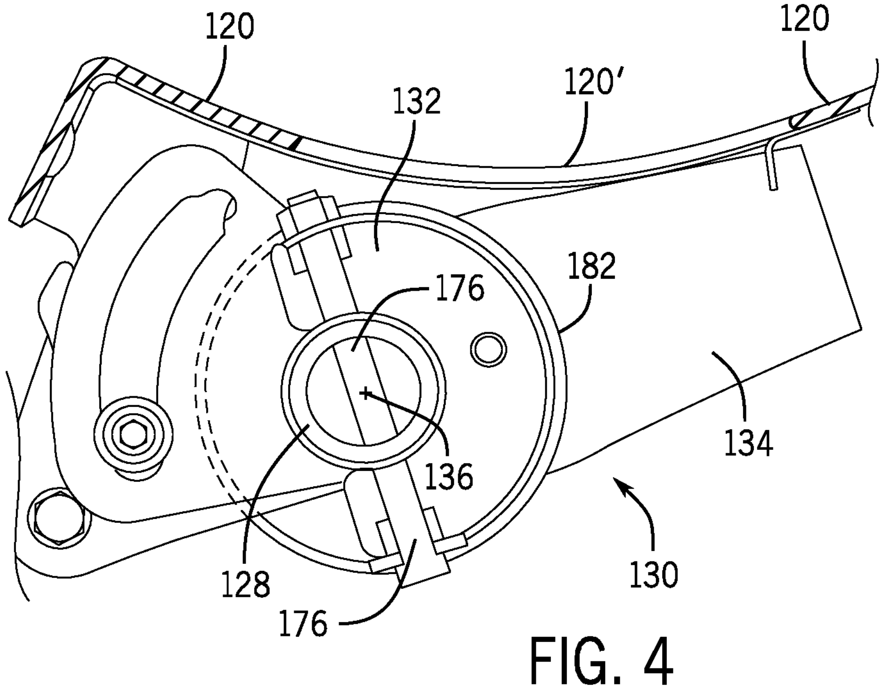
FIG. 4 is a cross-section view of the residue counterknife assembly of FIG. 2 in a retracted position.

Details of an exemplary crop residue chopper 116 are shown in more detail in FIGS. 2-4. The crop residue chopper 116 generally includes a housing 120 that defines a cutting chamber 122, a shaft 124 rotatably mounted in the cutting chamber 122, and a plurality of cutting knives 126 mounted on the shaft 124 to rotate within the cutting chamber 122. The cutting knives 126 may be rigidly fixed to the shaft 124 or connected by pivoting links (i.e., flail-type connections). The housing 120 is configured with an infeed opening 122' to direct residue into the path of the cutting knives 126, and an outfeed opening 122" to expel the chopped residue. The housing 120, cutting chamber 122, shaft 124, and cutting knives 126 may have any suitable or conventional construction, as known in the art, and need not be described in further detail herein.

The crop residue chopper 116 also includes a counterknife system comprising a counterknife blade shaft 128 to which counterknife assemblies 130 are attached. Each counterknife assembly 130 includes a knife holder 132 having one or more blades 134 mounted thereon. Any number of counterknife assemblies 130 may be attached along the length of the blade shaft 128, and the counterknife assemblies 130 also may be used in conjunction with other types of counterknives or counterknife assemblies not specifically described herein.

FIGS. 3 and 4 show the counterknife system in greater detail. FIG. 3 shows the counterknife system in the extended position, in which the blades 134 extend to the cutting chamber 122. FIG. 4 shows the counterknife system in the retracted position, in which the blades 134 are retracted outside the cutting chamber 122. The counterknife system optionally may be operated at one or more intermediate positions between the extended position and the retracted position. In some cases, the blades 134 may remain at least partially within the cutting chamber 122 when the counterknife system is in the fully-retracted position.

The counterknife blade shaft 128 extends parallel to the cutting knife shaft 124 along a blade shaft direction 136 (which is orthogonal to the page in FIGS. 2-5). In the figures, the blade shaft direction 136 is shown at the axis of rotation of the blade shaft 128, but it will be understood that references herein to a part extending along the blade shaft direction 136 do not require that part to be collinear with the blade shaft rotation axis. The blade shaft 128 may be rotated or otherwise moved by any suitable mechanism, such as a dedicated drive motor or hydraulic actuator, a power takeoff from another powered system, and so on.

Figure 5:
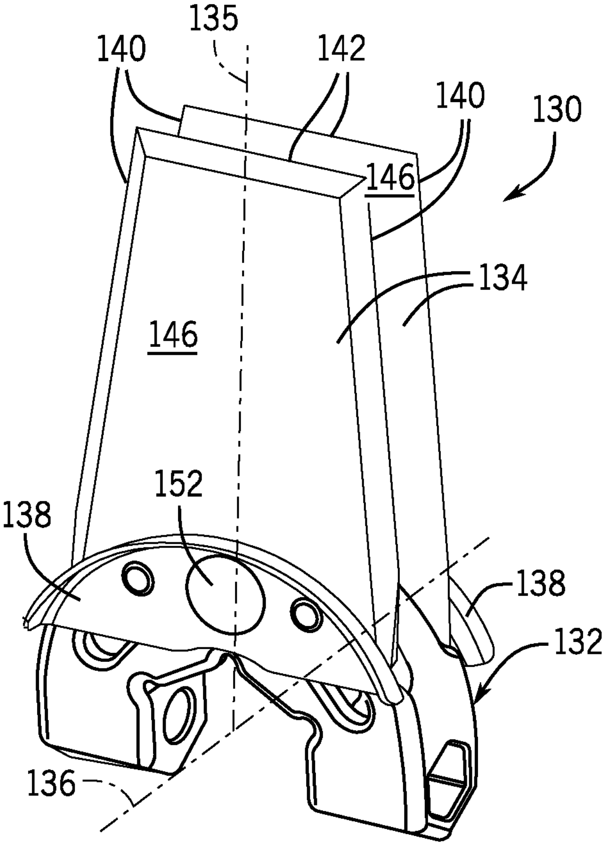
FIG. 5 is an isometric view of another embodiment of a residue counterknife assembly.
Figure 6:
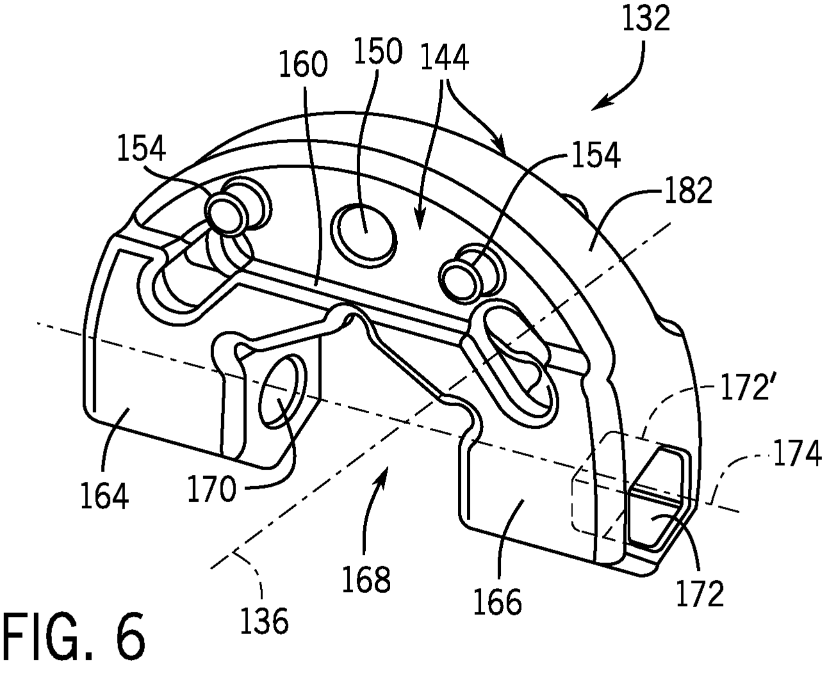
FIG. 6 is an isometric view of the knife holder of the embodiment of FIG. 5, as shown in isolation.

Details of an exemplary counterknife assembly 130 are shown in FIGS. 5-8, with FIGS. 5 and 6 showing the counterknife assembly 130 alone, and FIGS. 7 and 8 showing the counterknife assembly mounted to a blade shaft 128. As shown in FIG. 5, a counterknife assembly 130 includes first and second blades 134 that are mounted to the knife holder 132 (a single blade or more blades may be used in other embodiments). The counterknife assembly 130 also may include one or more debris shields 138, which are described in more detail below.

The blades 134 may have any suitable construction. For example, the blades 134 may comprise a trapezoidal plate of steel material having two opposed cutting edges 140, and an end edge 142 joining the two opposed cutting edges 140. The edges 140, 142 may be sharpened, and may have serrations or the like. The blades 134—and particularly the opposed cutting edges 140—may be symmetrical with respect to an axis 135 extending radially from the blade shaft direction 136 in a plane orthogonal to the blade shaft direction 136, so that the blades 134 operate in the same manner regardless of which cutting edge 140 faces the incoming crop residue. Each blade 134 also preferably extends along a respective blade plane as defined by either of the planar faces 146 extending between the opposed cutting edges 140.

Referring more specifically to FIG. 6, each blade 134 is attached to the knife holder 132 at a respective blade mount 144. In the shown example, the knife holder 132 has two blade mounts 144 located on opposite sides of the knife holder 132 with respect to the blade shaft direction 136 when the knife holder 132 is mounted to the blade shaft 128 (the second blade mount 144 is obscured in FIG. 6 by the body of the knife holder 132). The blade mounts 144 may comprise any structure suitable to firmly secure to the respective blade 134. In the shown example, each blade mount 144 comprises a planar surface 148 that contacts a corresponding planar portion of the respective blade 134 to provide face-to-face contact.

The blade mounts 144 may be configured to hold the blades 134 with their respective blade planes parallel, or at least generally parallel to each other. As used throughout herein, "generally parallel" means within 10 degrees of parallel, including typical manufacturing tolerances for the processes used to make the parts. When assembled to the knife holder 132, the blades 134 preferably are oriented with their respective planes 146 orthogonal, or at least generally orthogonal to the blade shaft direction 136. As used throughout herein, "generally orthogonal" means within 10 degrees of orthogonal, including typical manufacturing tolerances for the processes used to make the parts.

The blades 134 may be secured to the blade mounts 144 by any suitable fastener or connector. Preferably, only a single fastener is used to mount two blades 134 to their respective blade mounts 144. For example, the knife holder 132 may have a bore 150 that passes through the planar surfaces 148 of the blade mounts 144, and the blades 134 may have corresponding holes 156 that align with the bore 150, and a fastener 152 such as a carriage bolt or other threaded fastener (or an unthreaded pin or the like) may be passed through the blade holes 156 and the bore 150 and secured by a nut to hold the blades 134 to their respective blade mounts 144. Using a single fastener 152 to connect both blades 134 to the knife holder 132 is preferred to allow relatively rapid and simple removal and replacement of the blades 134, but other embodiments may secure each blade 134 to its respective blade mount 144 by its own single fastener (i.e., one fastener per blade), or multiple fasteners may be used to mount each or both blades 134 to their respective blade mounts 144.

The blades 134 and blade mounts 144 also may include features to help properly register the blades 134 in the correct position and/or hold the blade 134 against movement relative to its blade mount 144. For example, as shown in FIG. 6, each blade mount 144 may have one or more protrusions 154 (e.g., machined or cast features, protruding ends of roll-pins inserted into a casting, etc.) that extend perpendicular to the planar surface 148, and each blade 134 may have holes 158 that match and closely fit to the protrusions 154. As another example, the planar surfaces 148 may be recessed along the blade shaft direction 136 relative to other parts of the knife holder 132 (e.g., the arms 164, 166, as described below) to define a ledge 160 that abuts a corresponding edge 162 of the properly-mounted blade 134. Other alternatives and embodiments will be apparent to persons of ordinary skill in the art in view of the present disclosure.

The knife holder 132 has a first arm 164 and a second arm 166 that extend from the blade mounts 144 to define an opening 168 between the arms 164, 166. The opening 168 extends along the blade shaft direction 136, and is shaped to surround two opposite sides of the blade shaft 128. The first arm 164 has a first passage 170 extending through it, and the second arm 166 has a second passage 172 extending through it. The first and second passages 170, 172 are collinear with each other, and extend along a passage axis 174 that extends through the opening 168. The passage axis 174 intersects the blade shaft 128 when the knife holder 132 is mounted to the blade shaft 128, and preferably intersects the blade shaft direction 136. The passage axis 174 may be perpendicular to the blade shaft direction 136, but other orientations are possible.

Figure 9:
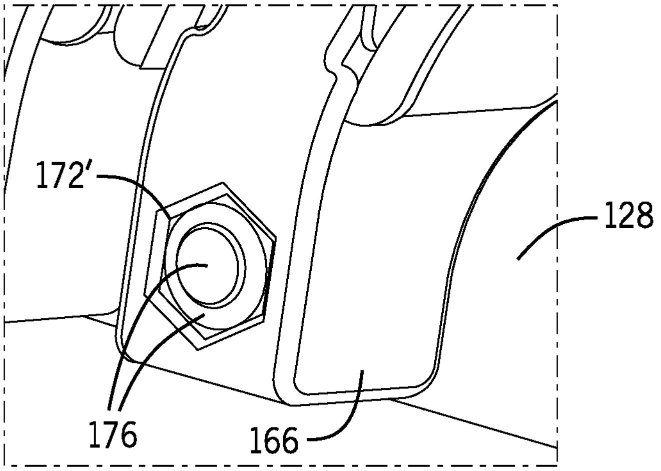
FIG. 9 is a detail view of a portion of a residue counterknife assembly.

The first and second passages 170, 172 are configured to receive a fastener 176, such as a bolt or pin. The fastener 176 extends through the passages 170, 172, and through a corresponding passage 178 that extends through the blade shaft 128 at the blade shaft direction 136. The fastener 176 may be secured in the holding position by any suitable mechanism, such as a threaded nut, threads formed internally to one of the passages 170, 172, a cotter pin or retaining clip, and so on. In some embodiments, one or both passages 170, 172 may be shaped to accommodate the head or a nut of a threaded fastener assembly. For example, as shown in FIGS. 6 and 9, the second passage 172 may have a non-circular bore 172' that extends along a portion of the passage's length, and receives a correspondingly-shaped fastener, such as a nut 176. The non-circular bore 172' allows the nut 176 to be easily inserted and removed, but prevents the nut 176 from rotating, which makes it easier to assemble the nut 176 to the remainder of the fastener 176 (i.e., to the threaded bolt). The non-circular bore 172' is shown as being hexagonal, but other shapes, such as square, can be used. It will be appreciated from the foregoing that a single "fastener," as used herein, can include a primary fastener (e.g., a bolt or structural pin), and any devices to secure the primary fastener in place (e.g., washers, nuts, retaining pins, retaining clips, etc.).

The opening 168 defined between the arms 164, 166 may have any suitable shape. In the embodiment of FIGS. 2-4, 9 and 10, the opening 168 is semicircular, and fits over a circular blade shaft 128. In the embodiment of FIGS. 5-8, the opening 168 comprises a plurality of planar faces 180*a*, 180*b*, 180*c*, 180*d* that surround the blade shaft direction 136, and are arranged in a non-circular pattern to engage corresponding faces of the blade shaft 128 to prevent the knife holder 132 from rotating, relative to the blade shaft 128, about the blade shaft direction 136. To this end, any suitable arrangement of planar faces 180 may be used, such as two parallel flat faces 180*a*, 180*d* that surround corresponding parallel faces on either side of the blade shaft 128. In the shown embodiment, there are four planar surfaces 180 arranged in a semi-hexagonal pattern, with a first face 180*a* on the first arm 164 being parallel to a second face 180*d* on the second arm 166. The other faces 180*b*, 180*c* join the first face 180*a* to the second face 180*d* to form four sides of a semi-hexagonal profile. In this example, the first passage 170 is formed through the first face 180*a*, and the second passage 172 is formed through the second face 180*d*.

The foregoing semi-hexagonal arrangement of faces 180 may be configured to match a hexagonal blade shaft 128, as shown, but the blade shaft 128 may have other shapes, such as square or rectangular, that still fit within the opening 168 and in abutment with one or more of the faces 180. In other cases, the planar faces 180 may have a semi-square shape (e.g., three planar faces 180 joined at 90° angles), and so on. It will also be appreciated that an opening having planar faces 180 can also be used with circular blade shafts or shafts having other shapes that do not provide structures (other than the fastener 176) that prevent the knife holder 132 from rotating on the blade shaft 128. Other alternatives and embodiments will be apparent to persons of ordinary skill in the art in view of the present disclosure.

The outer face 182 of the knife holder 132—that is, the outer perimeter with respect to the blade shaft direction 136—may have any suitable shape. In the shown embodiments, the outer face 182 is semicircular, which helps reduce the rotating profile of the knife holder 132 and thereby increase the effective lengths of the blades 134. The semi-circular profile is also expected to inhibit crop residue from attaching to the assembly.

As noted above, the counterknife assembly 130 also may include one or more debris shields 138. Details of exemplary debris shields 138 are shown in most detail in FIGS. 8 and 10. Each debris shield 138 is mounted to the knife holder 132 and extends away from the remainder of the counter-knife assembly 130 along the blade shaft direction 136, to form a structure to help inhibit debris from passing into the spaces between adjacent blades 134 and/or knife holders 132. For example, each debris shield 138 may include a semicircular wall 184 that extends along the blade shaft direction 136. As shown in FIG. 8, the semicircular walls 184 of adjacent debris shields 138 may extend towards each other to at least partially close the gap between adjacent blades 134 of each adjacent counterknife assembly 130. The semicircular walls 184 of the debris shields also may be shaped to match a semicircular outer face 182 of the knife holder 132, to provide a generally continuous blocking surface. This surface can face slots 120' through the housing 120 wall, through which the blades 134 extend into the cutting chamber 122, to thereby help prevent debris from passing though those slots 120' during operation (see, e.g., FIGS. 3 and 4).

Figure 10:
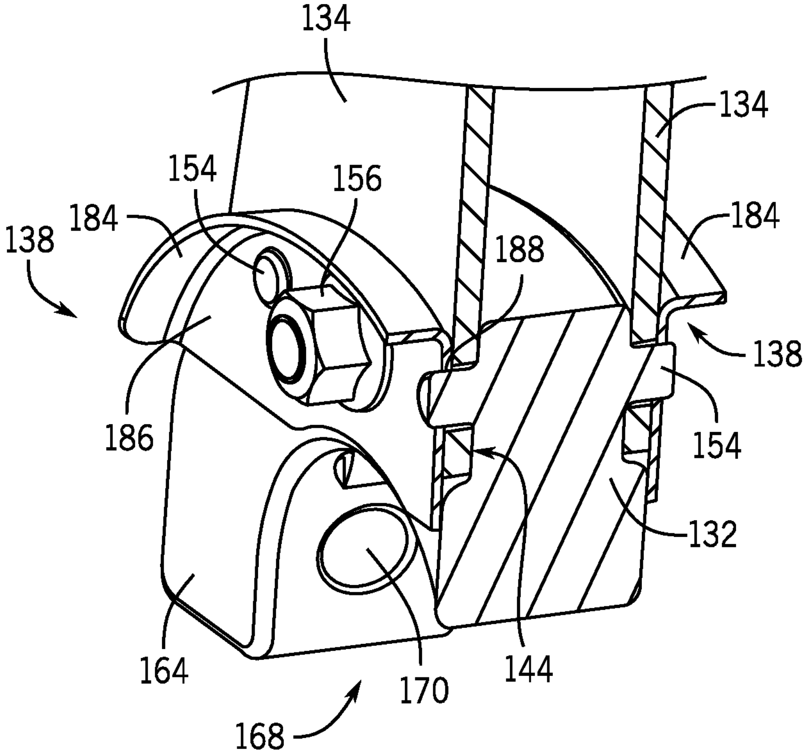
FIG. 10 is a sectioned isometric view of another embodiment of a counterknife assembly.

A debris shield 138 may be provided for each blade 146 and/or on each side of each counterknife assembly 130, but this is not strictly required. The debris shields 138 may be attached to the remainder of the counterknife assembly 130 by any suitable mechanism. For example, as best shown in FIG. 10, the debris shield 138 may be secured with the blade 146 between the debris shield 138 and the blade mount 144, by a single fastener 156 that holds the blade 124 to the blade mount 144. In this case, there are two blades 134 and two debris shields 138, all of which are secured by a single fastener 156.

The debris shields 138 also may include features to help maintain them in proper registration with the blade 134 and/or knife holder 132. For example, the debris shields 138 may have planar faces 186 with holes 188 that fit over the protrusions 154 that aid with positioning the blades 134, as discussed above. Other alternatives and embodiments will be apparent to persons of ordinary skill in the art in view of the present disclosure.

Figure 11:
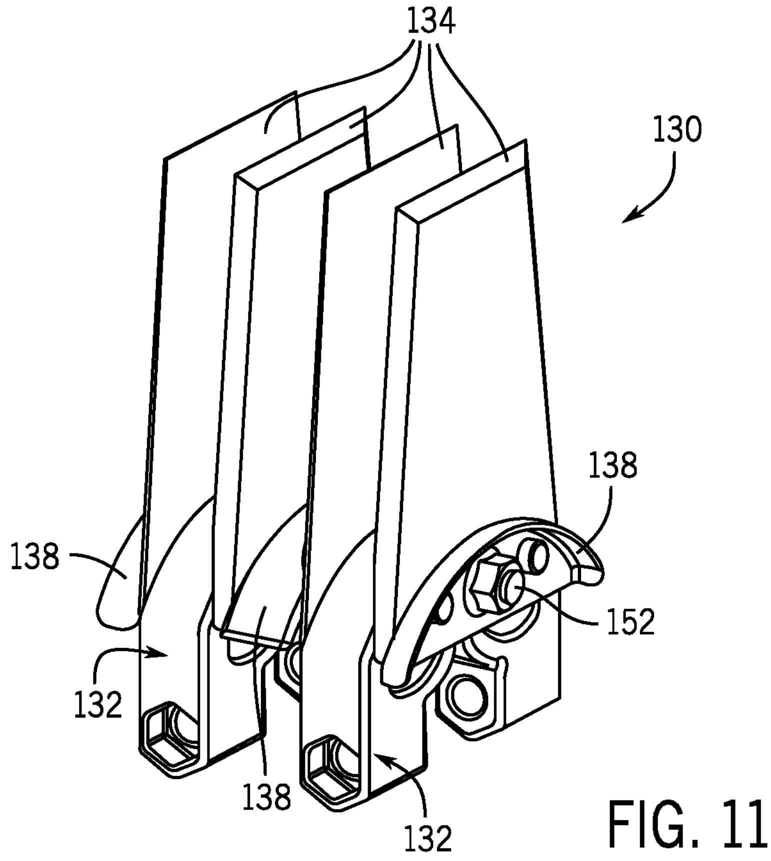
FIG. 11 is an isometric view of another embodiment of a residue counterknife assembly.
Figure 12:
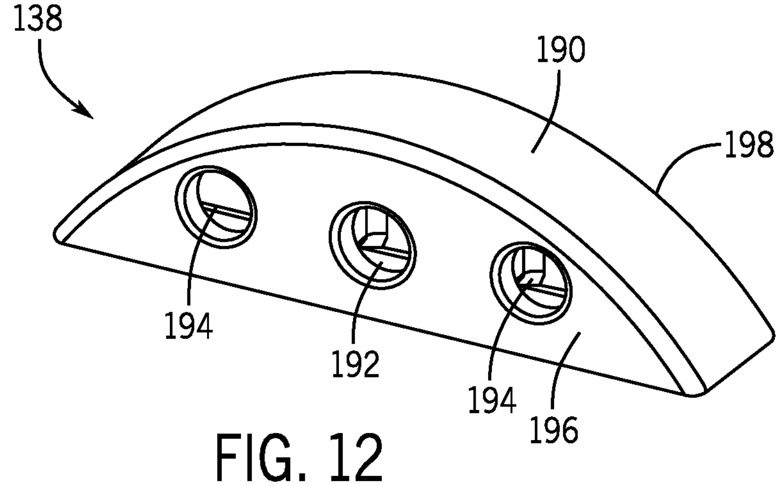
FIG. 12 is an isometric view of a spacer according to the embodiment of FIG. 11.

FIGS. 11 and 12 show an additional embodiment of a residue counterknife assembly 130. This example is essentially the same as the example of FIG. 6, but includes a debris shield 138 in the form of a spacer connected between two knife holders 132 to form a four-blade assembly. The debris shield 138 is clamped between adjacent blades 134 of the two knife holders 132, such that a fastener 152 (or multiple fasteners 152) can extend though the two knife holders, the blades 134, and the debris shield 138, to hold them all together. The residue counterknife assembly 130 also may include debris shields 138 as discussed above.

Spacer-type debris shields 138 also may be provided between any number of adjacent pairs of knife holders 132. For example, an arrangement of three knife holders 132 may be provided with a spacer-type debris shield 138 between each adjacent pair of knife holders 132, with one or more fasteners 152 extending though both debris shields 138 and all three knife holders 132 (and the knives 134) to hold them all together.

The spacer-type debris shield 138 may have any suitable construction, but preferably has a semicircular outer face 190 that matches the semicircular outer face 182 of the knife holder 132 (and semicircular walls 184 of additional debris shields 138, if used), to provide a generally continuous blocking surface. The spacer-type debris shield 138 also may include a passage 192 or passages to accommodate the fastener(s) 152, and receptacles 194 to receive protrusions 154 or other positioning structures. The spacer-type debris shield 138 preferably is symmetrical and reversible, for example by providing essentially identical opposite first and second faces 196, 198 that can be attached to adjacent knife holders 132. Other alternatives and embodiments will be apparent to persons of ordinary skill in the art in view of the present disclosure.

Embodiments such as described herein are expected to facilitate relatively fast, simple, and cost-effective servicing and replacement of chopper counterknives. For example, in an exemplary method, an operator can open the harvester to access the counterknives, remove the fastener 176 of a counterknife assembly 130, and pull the counterknife assembly out of the harvester. At this point, the operator can either install a new counterknife assembly 130 onto the blade shaft 128, or replace the same counterknife assembly 130 after servicing it (e.g., sharpening or replacing the blades). The counterknife assembly 130 can then be secured in place by reinstalling the fastener 176. In a preferred embodiment, there is only a single fastener 176 (e.g., a nut and bolt assembly) holding the counterknife assembly 130 to the blade shaft.

Furthermore, in a preferred embodiment, the counterknife assembly 130 is reversibly installable on the blade shaft 128 in two alternative positions to thereby rotate the blades 134 to face the opposite direction relative to the incoming stream of crop residue. For example, each blade 134 may have opposed edges 140, and the entire counterknife assembly 130 can be mounted to the blade shaft 128 with either of the opposed edges 140 facing in the direction of the incoming crop debris. This allows the operator to simply rotate the counterknife assembly 130 by 180 degrees and reinstall it on the blade shaft 128, to thereby present unused opposed blade edges 140 to the incoming gran residue.

This reversible construction can be achieved by making the entire counterknife assembly 130 either mirror-symmetrical about the shaft direction 136 or rotationally symmetrical about a line extending perpendicular to the shaft direction 136. Alternatively, only portions of the counterknife assembly 130 may be symmetrical. For example, only the opening 168 and passages 170, 172 may be symmetrical, such that the counterknife assembly 130 can be mounted by passing a fastener 176 through the passages 170, 172 and the corresponding blade shaft passage 178 regardless of which edges 140 of the blades 134 face the incoming crop residue. Other alternatives and embodiments will be apparent to persons of ordinary skill in the art in view of the present disclosure.

In addition to providing improved serviceability, embodiments are also expected to provide improved cost effectiveness by providing the knife holder 132 as a reusable part, and the blades 134 as replaceable or serviceable parts. In particular, it is only necessary to replace or resharpen the blades 134 during service to place the device back into working condition, while the knife holders 132 can be reused.

While the foregoing embodiments have been described in relation to a rotating counterknife blade shaft 128, the blade shaft 128 can have different constructions. For example, the blade shaft 128 may be formed as a plate that fits within the opening 168 between the counterknife assembly arms 164, 166. The blade shaft 128 also need not be rotatable. For example, the blade shaft 128 may be mounted in a non-rotational manner on an assembly that moves the blades 124 between the extended and retracted positions. Other alternatives and embodiments will be apparent to persons of ordinary skill in the art in view of the present disclosure.

It will appreciated that embodiments may be provided to the market in various states of assembly. For example, one embodiment may be provided as a counterknife assembly including a knife holder, which may be provided with or without blades and fasteners. Another embodiment may be provided as an assembly of a blade shaft having counterknife assemblies. Another embodiment may be provided as a towed agricultural harvester machine having a powered residue chopper with a counterknife system as described herein. Another embodiment may be provided as an self-propelled agricultural harvester including a threshing and separating system, powered drive wheels, and counterknife system as described herein. Other alternatives and embodiments will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. For example, a counterknife as described and claimed herein may be used in conjunction with other, conventional counterknives, and so on. Also, features identified in the singular or by a specific number are not intended to be limited to a single features or the described number of features unless specifically recited as being present only in the specified quantity.

The invention claimed is:

1. A residue counterknife assembly for use on an agricultural harvester, the residue counterknife assembly comprising:

a first blade extending in a first blade plane; and a knife holder comprising:

a first blade mount configured to secure to the first blade, a first arm extending from the first blade mount and having a first passage extending therethrough, and a second arm extending from the first blade mount and having a second passage extending therethrough, wherein:

the first arm and the second arm define c, the opening extends along a blade shaft direction that is generally orthogonal to the first blade plane, and the first passage and the second passage are collinear along an axis that passes through the opening, wherein the knife holder is reversibly installable in a first position and a second position on a blade shaft located within the opening, with the first passage and the second passage are collinear with a shaft passage extending through the blade shaft in either the first position or the second position.

2. The residue counterknife assembly of claim 1, further comprising a second blade extending in a second blade plane, and wherein the knife holder comprises a second blade mount located opposite to the first blade mount with respect to the blade shaft direction and configured to secure to the second blade with the second blade plane generally parallel to the first blade plane.

3. The residue counterknife assembly of claim 2, further comprising a single fastener securing the first blade to the first blade mount and the second blade to the second blade mount.

4. The residue counterknife assembly of claim 1, wherein the first blade mount comprises a planar surface extending in a first blade mount plane that is parallel to the first blade plane.

5. The residue counterknife assembly of claim 4, further comprising one or more protrusions extending from the planar surface and through respective holes through the first blade when the first blade is secured to the first blade mount.

6. The residue counterknife assembly of claim 4, wherein the planar surface is recessed in the blade shaft direction relative to the first arm and the second arm to define one or more ledges that abut an edge of the first blade when the first blade is secured to the first blade mount.

7. The residue counterknife assembly of claim 1, wherein the opening comprises a plurality of planar faces surrounding the blade shaft direction and arranged in a non-circular pattern.

8. The residue counterknife assembly of claim 1, wherein the opening comprises four planar faces surrounding the blade shaft direction and arranged in a semi-hexagonal pattern, with a first face on the first arm being parallel to a second face on the second arm, and wherein the first passage extends through the first face and the second passage extends through the second face.

9. The residue counterknife assembly of claim 1, wherein the second passage comprises a non-circular bore configured to receive a corresponding non-circular portion of a fastener to thereby prevent the non-circular portion of the fastener from rotating relative to the second passage.

10. The residue counterknife assembly of claim 9, wherein the non-circular bore is hexagonal.

11. The residue counterknife assembly of claim 1, wherein the knife holder has an outer face defining a semicircular surface facing away from the opening, and the semicircular surface is concentric with the blade shaft direction.

12. The residue counterknife assembly of claim 1, wherein the knife holder is attached to the blade shaft by a single fastener extending through the first passage, the second passage and the shaft passage.

13. The residue counterknife assembly of claim 1, further comprising a first debris shield mounted to the knife holder and extending along the blade shaft direction away from the first blade.

14. The residue counterknife assembly of claim 13, wherein the first blade is secured to the first blade mount between the first blade mount and the first debris shield, and one or more protrusions extend from the first blade mount through corresponding holes in the first blade and the first debris shield.

15. The residue counterknife assembly of claim 13, wherein the first debris shield comprises a semicircular wall extending along the blade shaft direction.

16. The residue counterknife assembly of claim 13, wherein the first debris shield comprises a first side facing the knife holder, and a second side, opposite the first side, and configured to connect to a second knife holder.

17. An agricultural harvester machine comprising:

a chassis configured for movement on a surface; and a residue chopper comprising:

a housing defining a cutting chamber;

a shaft rotatably mounted within the cutting chamber;

a plurality of cutting knives extending radially from the shaft;

a counterknife blade shaft mounted relative to the housing outside the cutting chamber and extending along a blade shaft direction; and a plurality of residue counterknife assemblies releasably secured to the counterknife blade shaft, wherein each residue counterknife assembly comprises:

a first blade extending in a first blade plane that is generally orthogonal to the blade shaft direction, a second blade extending in a second blade plane that is generally orthogonal to the blade shaft direction, and a knife holder comprising:

a first blade mount configured to secure to the first blade, a second blade configured to secure to the second blade, a first arm extending from the first blade mount and having a first passage extending therethrough, and a second arm extending from the first blade mount and having a second passage extending therethrough, wherein:

the first arm and the second arm define an opening between the first arm and second arm, the opening extends along to the blade shaft direction, and the first passage and the second passage are collinear and intersect to the blade shaft direction.

18. The agricultural harvester machine of claim 17, wherein each residue counterknife assembly comprises a first debris shield extending along the blade shaft direction away from the first blade and a second debris shield extending along the blade shaft direction away from the second blade.

19. The agricultural harvester machine of claim 17, further comprising:

a threshing and separating system attached to the chassis and configured to deliver crop residue to the residue chopper; and powered wheels configured to move the chassis on the surface.

20. A method for servicing a counterknife system in an agricultural harvester, the counterknife system comprising: a blade shaft extending along a blade shaft direction, and at least one counterknife assembly comprising at least one blade, a knife holder having a blade mount configured to secure to the at least one blade, a first arm extending from the blade mount and having a first passage extending therethrough, and a second arm extending from the blade mount and having a second passage extending therethrough, wherein the first arm and the second arm define an opening between the first arm and second arm, wherein the opening is configured to surround at least two sides of the blade shaft, and wherein the first passage and the second passage are collinear with a shaft passage extending through the blade shaft, wherein the method comprises:

releasing a single fastener securing a counterknife assembly to the blade shaft;

rotating the counterknife assembly to reverse the relative positions of the first blade and the second blade on the blade shaft and along the blade shaft direction; and securing the single fastener to secure the counterknife assembly to the blade shaft in the rotated position.

* * * * *